(12) United States Patent
Aronson (10) Patent No.: US 8,504,821 B2
(45) Date of Patent: Aug. 6, 2013

(54) ENCRYPTED OPTOELECTRONIC MODULE

(75) Inventors: Lewis B. Aronson, Los Altos, CA (US); Jahye Jenny Aronson, legal representative, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 310 days.

(21) Appl. No.: 12/831,466

(22) Filed: Jul. 7, 2010

(65) Prior Publication Data

US 2011/0033049 A1 Feb. 10, 2011

Related U.S. Application Data

(60) Provisional application No. 61/224,540, filed on Jul. 10, 2009.

(51) Int. Cl.
*H04L 29/06* (2006.01)
(52) U.S. Cl.
USPC .......................................... 713/153; 713/189
(58) Field of Classification Search
USPC .......................... 713/153, 189, 194; 380/256
See application file for complete search history.

(56) References Cited

U.S. PATENT DOCUMENTS 5,793,871 A * 8/1998 Jackson .......................... 380/54
5,864,625 A 1/1999 Rutledge 6,993,654 B2 * 1/2006 Seki et al. ..................... 713/172
2004/0081471 A1 * 4/2004 Lee ................................ 398/193
2005/0113068 A1 * 5/2005 Hoffmann ..................... 455/411
2006/0072753 A1 4/2006 Nishimura
2008/0063183 A1 * 3/2008 Greco et al. ..................... 380/2
2008/0130887 A1 6/2008 Harvey et al.

FOREIGN PATENT DOCUMENTS

WO 2005/088898 9/2005
WO 2009/059331 5/2009

OTHER PUBLICATIONS

International Search Report and Written Opinion of the International Searching Authority mailed on Jan. 20, 2011 in connection with corresponding International Application No. PCT/US2010/041586.

* cited by examiner

*Primary Examiner* — Edward Zee
(74) *Attorney, Agent, or Firm* — Maschoff Brennan (57) ABSTRACT

Methods and systems for encrypting and decrypting data are described. An exemplary system includes an optical transceiver that includes at least one of an encryption block and a decryption block. The optical transceiver also has at least one encryption and decryption key stored at the transceiver. The encryption block receives unencrypted data and performs encryption operations on the data using the encryption and decryption key. The decryption block receives encrypted data and performs a decryption operation using the encryption and decryption key.

17 Claims, 7 Drawing Sheets

ENCRYPTED OPTOELECTRONIC MODULE

CROSS-REFERENCE TO RELATED APPLICATIONS

This application claims the benefit of U.S. Provisional Application No. 61/224,540, filed Jul. 10, 2009, which is incorporated herein by reference in its entirety.

BACKGROUND

Fiber optic transmissions systems have become increasingly important in data communications and telecommunications systems as data rates have risen to rates of 1 Gb/s and beyond. Local area network, storage area network, and wide area network systems generally employ fiber optic communication links for data rates of 1 Gb/s and above and for distances beyond a few meters. One arrangement for interconnecting two pieces of networking equipment is through the use of pluggable fiber optic transceivers, which are in turn connected over a fiber optic cable. The networking equipment will typically provide an electrical port with standardized mechanical and electronic specifications, which will accept an optical transceiver module meeting the same specifications. One example of such a specification is the Small Form-factor Pluggable ("SFP") transceiver which operates at data rates from 1-4 Gb/s. A number of other transceiver form factor standards exist such as the SFP+ (8-10 Gb/s), and 10 Gb/s XFP, X2, XPAK and XENPAK standards.

Another arrangement for interconnecting networking equipment uses an active optical cable, which integrates the function of a fiber optic transceiver into a plug at each end of a fiber optic cable. In this arrangement, benefits of fiber communication (e.g., high data rates over long distances with a thin cable) may be achieved with the external functionality of an electrical cable.

Often, it is desirable to encrypt the data transmitted by an optical transceiver for security reasons. This is typically done by a host computer that is connected to the optical transceiver. The host will include encryption means and an encryption key that is used to encrypt the data. The encrypted data is then transmitted by the optical transceiver.

The encrypted data is received at a second optical transceiver, which provides the encrypted data to a second host computer that is connected to the second optical transceiver. The second host computer will have decryption means and a decryption key that matches the encryption key. The encrypted data is then decrypted.

Although this method is sufficient for the encryption and decryption, it does present security problems for the matching encryption and decryption keys. Since these keys are stored on the host computers, there is a potential that one of them may become compromised due to lack of security systems in the host. In addition, since a host typically is accessible to many users, there is the potential that an unauthorized user may access one of the keys. As will be appreciated, once the encryption key is known by an unauthorized user, that user will be able to decrypt the encrypted data for malicious reasons.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein relate to transceiver comprising a transmitter optical subassembly, a receiver optical subassembly, and at least one encryption and decryption key. The optical transceiver also includes at least one of an encryption block operably connected to the transmitter optical subassembly, wherein the encryption block is configured to perform an encryption operation on data received from a host device using the at least one encryption and decryption key and to provide the resulting encrypted data to the transmitter optical assembly, and a decryption block operably connected to the receiver optical subassembly, wherein the decryption block is configured to perform a decryption operation on data received from the receiver optical subassembly using the at least one encryption and decryption key.

Embodiments disclosed herein also relate to a method for encrypting and/or decrypting data in an optical transceiver that includes at least one of an encryption block and a decryption block and further includes at least one encryption and decryption key. The method comprises an act of receiving unencrypted data at an encryption block from a host device that is coupled to the optical transceiver, an act of the encryption module performing an encryption operation on the received unencrypted data using the at least one encryption and decryption key to thereby encrypt the data, and an act of transmitting the encrypted data to a remote optical transceiver.

In some embodiments the method may further comprise an act of receiving at an decryption block from the remote optical transceiver encrypted data, an act of the decryption module performing a decryption operation on the received encrypted data using the at least one encryption and decryption key to thereby decrypt the data, and an act of providing the unencrypted data to the host device.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Methods and systems for encrypting and decrypting data are described. An exemplary system includes an optical transceiver that includes at least one of an encryption block and a decryption block. The optical transceiver also has at least one encryption and decryption key stored at the transceiver. The encryption block receives unencrypted data and performs encryption operations on the data using the encryption and decryption key. The decryption block receives encrypted data and performs a decryption operation using the encryption and decryption key.

Figure 1:
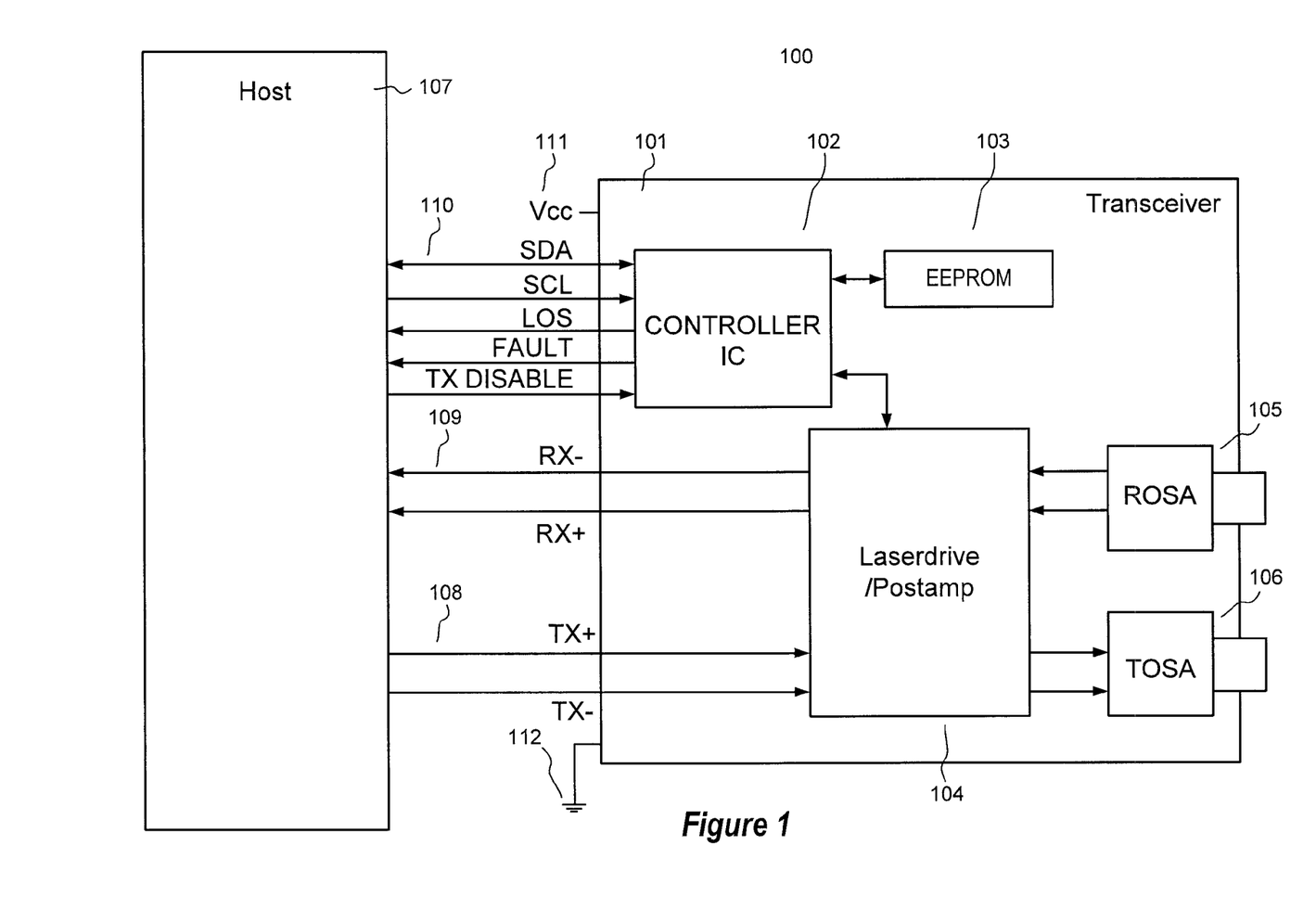
FIG. 1 illustrates a block diagram of an optical transceiver without encryption and decryption means.

Reference is first made to FIG. 1, which shows a schematic representation of a fiber optic transceiver 100 including its circuitry and components. Fiber optic transceiver 100 may include a circuit board 101 that contains at a minimum a receiver circuit, a transmit circuit, a power connection 111, and a ground connection 112.

The receiver circuit may receive relatively small optical signals at an optical detector and may amplify and limit the signals to create a uniform amplitude digital electronic output. The receiver circuit may consist of a Receiver Optical Subassembly ("ROSA") 105, which may include a fiber receptacle as well as a photodiode and preamplifier ("preamp") circuit. ROSA 105 may in turn be connected to a post-amplifier portion ("postamp") of a laser driver/postamp integrated circuit 104, which may generate a fixed output swing digital signal and may be connected to a host device 107 via high-speed differential receiver data lines 109 (RX+ and RX−). It will be appreciated that in some embodiments, the receiver data line 109 may be implemented as single ended lines.

The transmitter circuit, or laser driver circuit, may accept high-speed digital data and may electrically drive a Light Emitting Diode ("LED"), laser diode, or other optical signal source, to create equivalent optical pulses. The transmit circuit may consist of a Transmitter Optical Subassembly ("TOSA") 106 and a laser driver portion of the laser driver/postamp integrated circuit 104. TOSA 106 may include a fiber receptacle as well as an optical signal source such as the laser diode or LED. The laser driver portion of the laser driver/postamp integrated circuit 104 may include an alternating current ("AC") driver to provide AC current to the laser diode or LED. The laser driver portion of the laser driver/postamp integrated circuit 104 may also include a direct current ("DC") driver to provide bias current to the laser diode or LED. The signal inputs for the AC driver may be obtained via high-speed transmitter data lines 108 (TX+ and TX−). It will be appreciated that in some embodiments, the transmitter data lines 108 may be implemented as single ended lines. It will also be appreciated that although the laser driver and post-amplifier are shown as being integrated into IC 104, in alternative embodiments the laser driver and post-amplifier may be separated IC as circumstances warrant.

Transceiver 100 may include various inputs and/or outputs with respect to host device 107, including, for example, a low-speed serial communications path 110—including a serial clock line ("SCL") and a serial data line ("SDA")—a Loss of Signal ("LOS") indicator to indicate that a receive signal is not detected, and/or a fault indicator to indicate that the transceiver module is running too hot. Optical transceivers employing these input and/or output connections may include a transceiver controller 102 located either within, or outside, transceiver 100.

Transceiver 100 may also include a memory module, such as an Electrically Erasable Programmable Read Only Memory ("EEPROM") 103, to store information including, for example, standardized serial identification ("ID") information, readable by transceiver controller 102.

Figure 2:
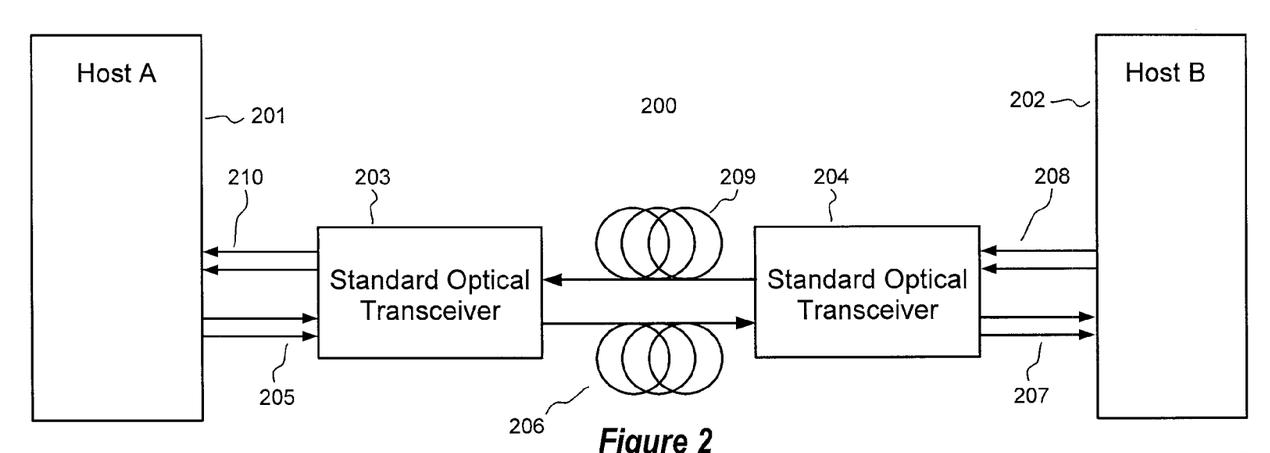
FIG. 2 illustrates a block diagram of an unencrypted optical link.

FIG. 2 discloses an unencrypted optical link 200. The unencrypted optical link 200 includes an optical transceiver 203 that is coupled to an optical transceiver 204 via optical fibers 206 and 209. The optical transceivers 203 and 204 may correspond to the optical transceiver 100 previously described.

As further illustrated, the optical transceiver 203 receives high speed data from a host 201 via transmit data lines 205. The optical transceiver 203 also provides high speed data to host 201 via receiver data lines 210. Likewise, optical transmitter 204 receives high speed data from a host 202 via transmit data lines 208 and provides high speed data to host 202 via receiver data lines 208.

Figure 3:
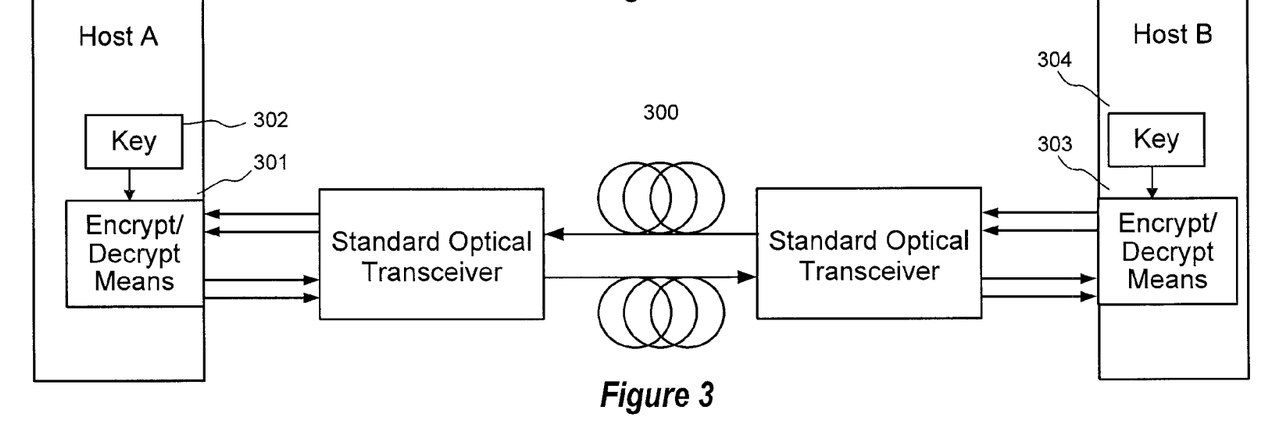
FIG. 3 illustrates a block diagram of an optical link with host based encryption and decryption.

Turning now to FIG. 3, an optical link 300 is shown. As illustrated, optical transceiver 300 is similar to optical transceiver 200 previously described. Accordingly, like elements will not be described.

As further illustrated, host 305 includes an encryption/decryption key 302, which may be any reasonable encryption/decryption key. In some embodiments, encryption/decryption key 302 may be a separate encryption key and a separate decryption key. In addition, the host 305 includes an encrypt/decrypt means 301. Encrypt/decrypt means 301 may be any reasonable means that is configured to encrypt data and/or decrypt data. In operation, encrypt/decrypt means 301 uses key 302 to encrypt a data signal that is to be transmitted and also used the key 302 to decrypt encrypted data that is received.

FIG. 3 also shows that host 306 includes an encryption/decryption key 304 and encrypt/decrypt means 303. In some embodiments, encryption/decryption key 303 may be a separate encryption key and a separate decryption key. In operation, encrypt/decrypt means 303 uses key 304 to encrypt a data signal that is to be transmitted and also used the key 302 to decrypt encrypted data that is received.

In some embodiments, the host 305 may encrypt a high speed data signal through the use of key 302 and encrypt/decrypt means 301. This encrypted data signal may then be sent over the optical link 300 to host 306. As mentioned, the encrypt/decrypt means 303 will then use key 304 to decrypt the data signal so that is may be used by host 306. As will be appreciated, as long as keys 302 and 304 are compatible, then host 306 will be able to decrypt the encrypted data.

In other embodiments, the host 306 may encrypt a high speed data signal through use of key 304 and encrypt/decrypt means 303. This encrypted data signal may then be sent over the optical link 300 to host 305. The encrypt/decrypt means 301 will then use key 302 to decrypt the data signal so that is may be used by host 305.

In some embodiments the encrypt/decrypt means 301 and the encrypt/decrypt means 303 need not be part of host 305 and 306. In such embodiments, the encrypt/decrypt means may be external to the hosts. The hosts would send data for encryption and decryption to the external encrypt/decrypt means. The external encrypt/decrypt means would encrypt or decrypt the data as needed and provide the data to the hosts 305 and 306.

As mentioned above, the embodiments of FIG. 3, while providing encryption and decryption, may not provide sufficient security for the encryption and decryption keys. Advantageously, the principles of the present invention provide for enhanced security of the encryption and decryption keys by storing the encryption and decryption keys in the transceiver. In addition, the encryption and decryption means are also in the transceiver, thus helping to prevent the copying or other unauthorized access to the keys.

Figure 4:
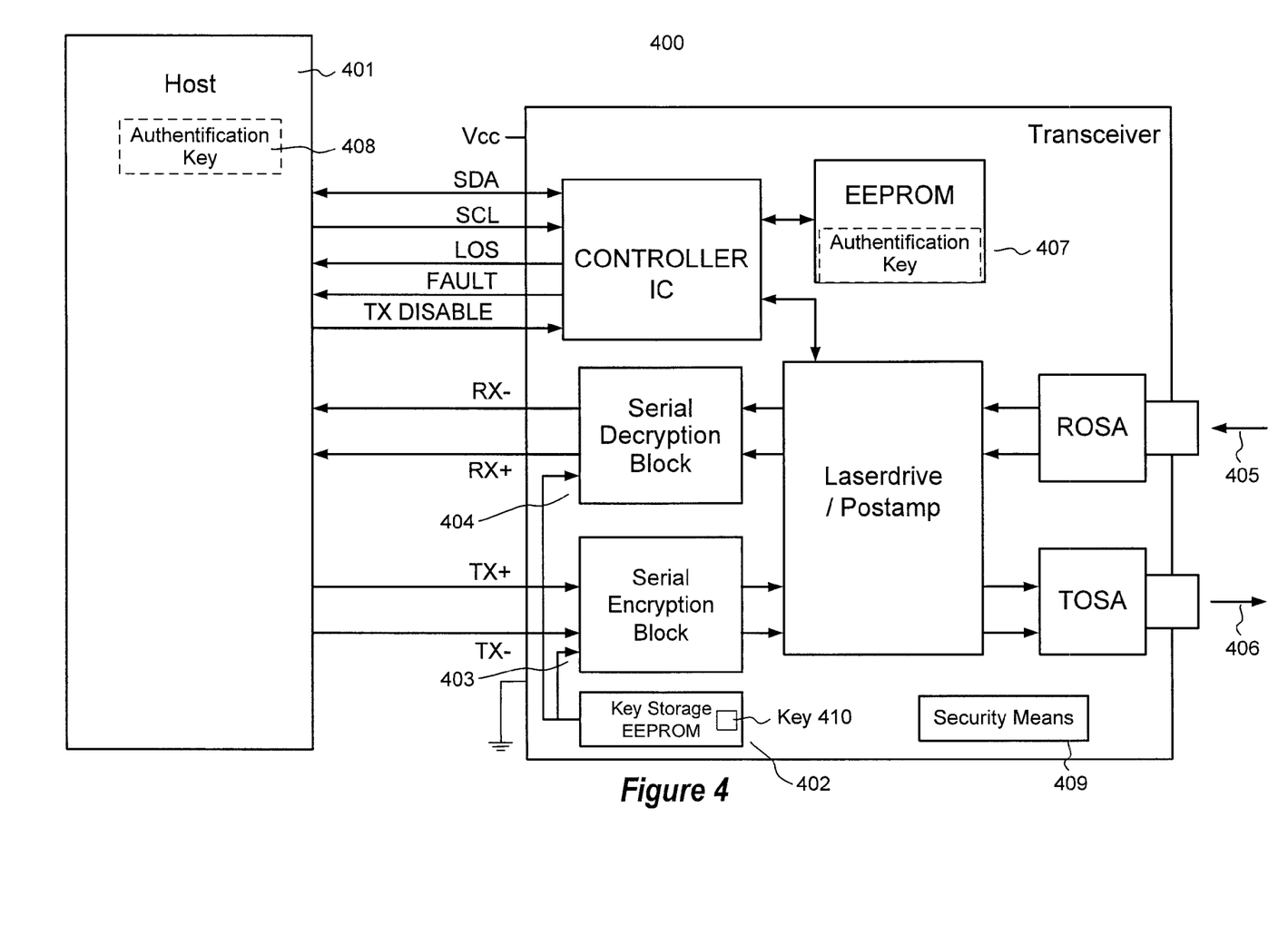
FIG. 4 illustrates a block diagram of an optical transceiver with encryption and decryption means.

Attention is now made to FIG. 4, which shows an optical transceiver 400 configured with encryption and decryption capabilities in accordance with the principles of the present invention. As shown, optical transceiver 400 includes several elements in common with transceiver 100 and thus these elements will not be described further.

In order for the encryption and decryption process to provide a more secure link, it will be appreciated that optical transceiver 400 should be part of a unique pair of optical transceivers that together form an encrypted link. Limiting the transceivers to a pair (or some other small number) ensures that any encryption/decryption key or keys remain secure. Accordingly, although only one optical transceiver 400 is described, it will appreciated that its matching transceiver will be virtually identical. Specifically, the matching pairs will include the same encryption/decryption key or keys and compatible encryption and decryption means so that a message encrypted at on a first transceiver of the pair may be decrypted by the other transceiver.

Optical transceiver 400 includes a key storage unit 402. In some embodiments, the key storage 402 may be an EEPROM. In other embodiments, key storage 402 may be any suitable non-volatile memory that can store encryption and decryption keys. In further embodiments, key storage 402 may be part of the general transceiver EEPROM or perhaps as part of another element of transceiver 400.

In operation, key storage 402 is configured to store one or more encryption and/or decryption keys 410 that are used in an encryption and/or decryption process. The encryption and/or decryption keys 410 may be written into key storage 402 in various ways. For example, the encryption and/or decryption keys 410 may be written into key storage 402 at the manufacturing stage. To ensure that the encryption and/or decryption keys 410 are unique, they would not be used by another transceiver pair. That is only, only optical transceiver 400 and its matching pair would have the unique encryption and/or decryption keys 410 written to them.

A second approach would be to allow an end user to program the encryption and/or decryption keys 410 into key storage 402. If this were done on a write only interface, then the encryption and/or decryption keys would remain unknown to others. It will be appreciated that the end user is unlikely to disclose the encryption and/or decryption keys 410 to an undesired third party.

FIG. 4 also shows a serial encryption block 403. In operation the serial encryption block 403 receives unencrypted transmit data from the host 401 and encrypts the data using an encryption key 410 from key storage 402. The encrypted transmit data may then be sent by TOSA 406 to the matching transceiver for decryption.

The encryption block 403 may be any reasonable encryption block and may comprise hardware, software, or any combination of hardware and software. In some embodiments, the encryption block may perform various encryption algorithms depending on design constraints and desired tradeoffs. For example, the encryption algorithm may be publicly available, like the SFF-8472 standard. To increase security, the algorithm may use a sufficiently long encryption key 410 to ensure against attacks such as brute-force attacks that analyze unencrypted and encrypted data set pairs. An encryption algorithm having a relatively simple implementation may be selected in view of the frequently limited computational power and memory available in an optical transceiver. A block cipher, such as Advanced Encryption Standard ("AES"), which has been standardized by the U.S. government, may be used. See Federal Information Processing Standards Publication 197, *Advanced Encryption Standard* (*AES*), Nov. 26, 2001. The AES cipher may work with 128-bit data sets and can use keys of length 128, 192 or 256 bits.

Figure 5:
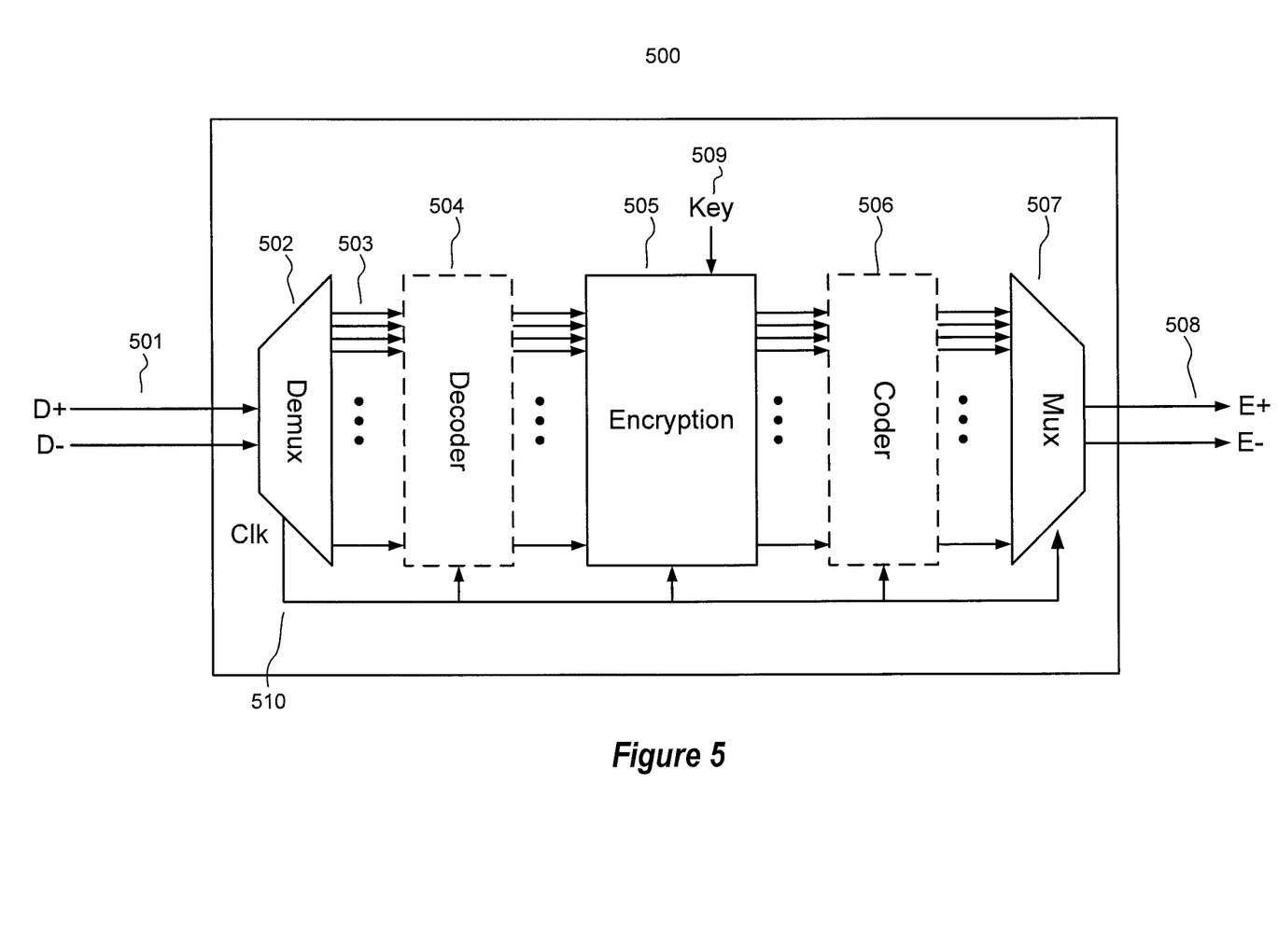
FIG. 5 illustrates a block diagram of a serial data encrypter.

FIG. 5 illustrates one embodiment of serial encryption block 403, designated at 500. As shown, high speed serial data 501 is received from a host, such as host 401. In some embodiments, the data rate may be 10 gigabytes a second, although other data rates are also contemplated.

A demultiplexer 502 receives the unencrypted serial data 501 and converts the signal into a parallel stream of data 503. In some embodiments, this may result in 32, 64, or 128 bit wide stream of parallel data. A clock signal 510 is provided by the demultiplexer 502 to ensure constant clocking.

In some embodiments, the unencrypted parallel data 503 is input into encryption unit 505. The encryption unit 505 uses an encryption key 509 from key storage 402 to perform the encryption operation on the parallel data 503. The encrypted parallel data 503 is then received by the multiplexer 507, where it is converted back into serial data 508. The encrypted serial data 508 may then be transmitted by TOSA 406 to the matching transceiver for decryption and other operations.

In some embodiments, the data received from host 401 includes address header data or other header data that includes important information about the data payload, but that is not part of the data payload. In other embodiments, the received data may include extra bits that help to align the data signals. For example, a 64 bit payload may also include an additional zero bit and an additional one bit for alignment and other purposes. Thus, the data is 66 bits.

As can be appreciated, in such embodiments it may detrimental if this header or alignment information is encrypted by encryption unit 505. For instance, in some long haul embodiments there may be several switches and repeaters in the optical link between transceiver 400 and the matching transceiver that includes the decryption means. While the switches and repeaters do not need to read the data payload, they will often need to read the address header information and the like so that they know where to send the data.

Accordingly, in some embodiments, serial encryption block 500 may also include a decoder 504 that is placed between the demultiplexer 502 and the encryption unit 505. The decoder 504, which may be any combination of hardware and software, is configured to receive the parallel data 503. The decoder 504 will then determine the portion of the data 503 that includes the header or alignment data previously discussed. The decoder 504 removes the header or alignment data from the data 503 so that these are not encrypted when encryption unit 505 encrypts the remaining data 505. Alternatively, the decoder 504 may simply mark the header or alignment data so that it is not encrypted.

A coder 506 is placed between the encryption unit 505 and multiplexer 507. The coder 506, which may be any combination of hardware and software, receives the encrypted data 503 from the encryption unit 505. The coder then adds the header or alignment data that was removed by the decoder back into the encrypted parallel data 503. In this way, the data 508 will include the encrypted data payload and will have its header and other similar information unencrypted.

Returning to FIG. 4, optical transceiver 400 also includes a serial decryption block 404. In operation the serial decryption block 404 receives encrypted receive data from the matching transceiver via ROSA 405 and decrypts the data using a decryption key 410 from key storage 402. The decrypted receive data may then be sent to host 401.

The serial decryption block 404 may be any reasonable decryption block and may comprise hardware, software, or any combination of hardware and software. In some embodiments, the serial decryption block 404 may perform various decryption algorithms depending on design constraints and desired tradeoffs. Typically, the decryption algorithms will be the inverse of the algorithm that encrypted the data. In this way, the decryption block will be able to decrypt the encrypted data. It will also be appreciated that the decryption key 410 utilized by decryption block 404 will need to match the encryption key used at the transceiver pair so that the decryption process will work.

Although shown as separate blocks, in some embodiments serial encryption block 403 and serial decryption block 404 may be the same block. In addition, both of the blocks or one of them may be part of another element of transceiver 400 such as the controller IC or the laser driver/postamp.

Figure 6:
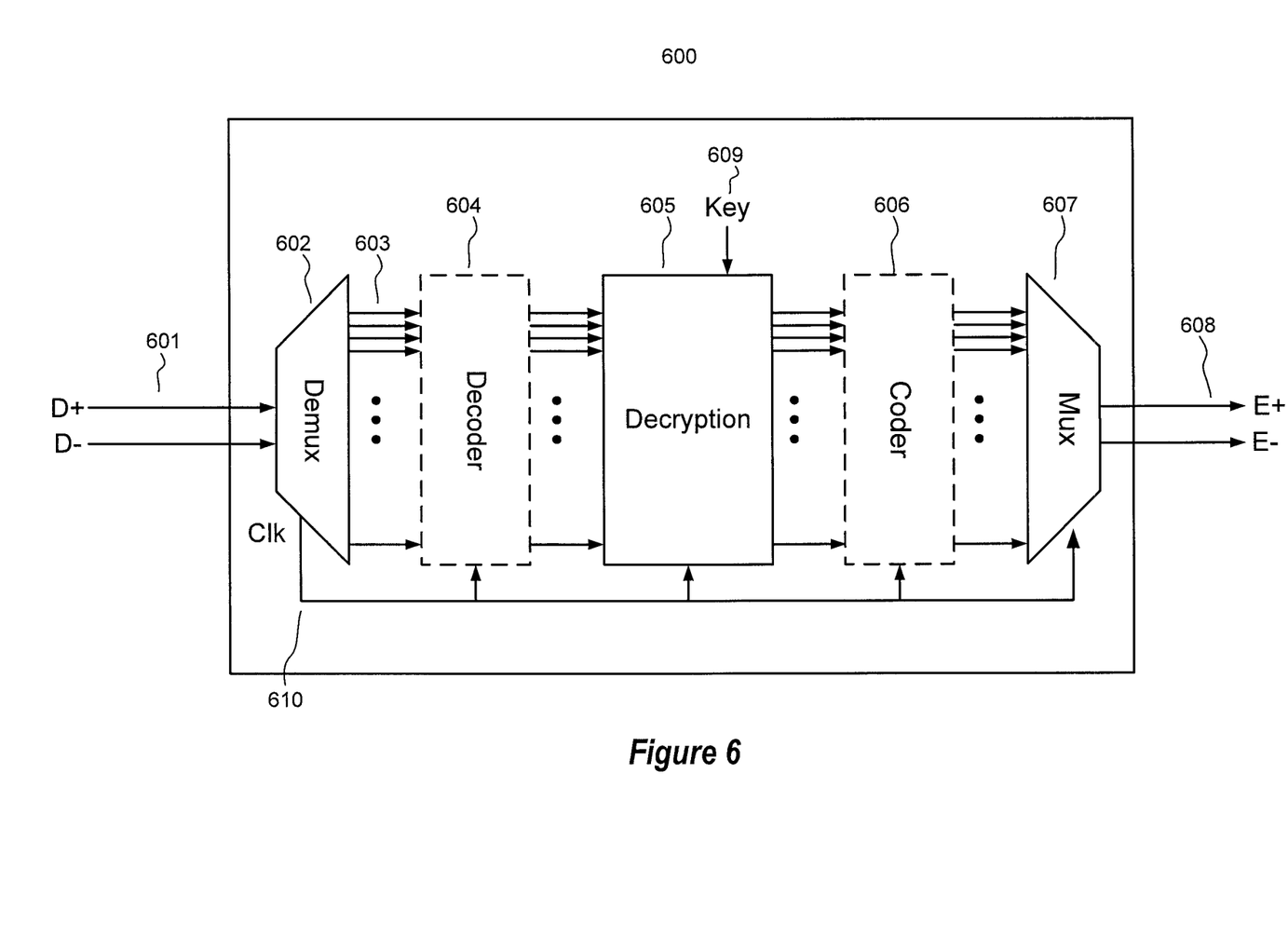
FIG. 6 illustrates a block diagram of a serial data decryptor.

FIG. 6 illustrates a specific embodiment of decryption block 404, designated at 600. A demultiplexer 602 receives the encrypted serial data 601 and converts the data into a parallel stream of data 603. In some embodiments, this may result in 32, 64, or 128 bit wide parallel stream of data. A clock signal 610 is provided by the demultiplexer 602 to ensure constant clocking.

In some embodiments, the encrypted parallel data 603 is input into decryption unit 605. The decryption unit 605 uses a decryption key 609 from key storage 402 to perform the decryption operation on the encrypted parallel data 603. The decrypted parallel data 603 is then received by the multiplexer 607, where it is converted into unencrypted serial data 608. The unencrypted serial data 608 may then be provided to the host 401.

In some embodiments, decryption block 600 may also include a decoder 604 that is placed between the demultiplexer 602 and the decryption unit 605 and a coder that is placed between the decryption unit 605 and the multiplexer 607. As mentioned above, there may be embodiments were the data includes header information that may be destroyed by the decryption process. Accordingly, the decoder 604 and the coder 606 operate to remove the header information from the data prior to decryption and then to restore this information as previously discussed above in relation to encryption block 500.

Returning again to FIG. 4, an authentication key 407 is shown as part of transceiver 400 and an authentication key 408 is shown as part of host 401. The authentication keys 407 and 408 may be used to authenticate the transceiver 400. In other words, because of the desire to maintain the secrecy of the encryption and/or decryption keys stored in key storage 402, it is important to ascertain that optical transceiver 400 is authorized. If the transceiver 400 is not authorized, then perhaps the encryption and/or decryption keys stored in key storage 402 could be comprised in some manner.

Alternatively, a transceiver module with an encryption key that did not match the decryption key of the matching transceiver could inadvertently be coupled to host 401. In such a case, the module that was inadvertently coupled would encrypt the data. However, the matching transceiver at the other end of the link would not be able to decrypt the data because of keys would not match.

In one embodiment, the host 401 uses the authentication key 408 to generate a challenge signal which is sent to the transceiver 400. The transceiver 400 in turn uses the authentication key 407 to respond to the message. If the response is appropriate, then the host 401 knows that the transceiver 400 is authenticated. If the response is not appropriate, then the host 401 would know that the transceiver 400 was not authentic and would not transmit data to it. Additional detail regarding the authentication keys is found in commonly assigned, co-pending U.S. patent application Ser. No. 12/264,194, filed Nov. 3, 2008, which is incorporated herein by reference in its entirety.

In some embodiments, the optical transceiver 400 may include security means 409. Security means 409 may include various sensors and the like that are configured to determine if there has been any attempt to access the keys 410 in key storage 402. For example, in some embodiments the security means 409 may be configured to determine if any attempt has been made to remove the cover of the transceiver 400 module. If so, then security means may inform the host 401 of this so that a user may then determine if the security of the keys 410 has been compromised. In other embodiments, the security means 409 may determine that an attempt has been made to access or change the keys 410 by use of computing means. In such embodiments, the security means 409 may then inform host 401 of this.

In other embodiment, security means 409 may be configured to erase the keys 410 or cause that control module 411 erase the keys to ensure that they are not discovered by an unauthorized source. As will be appreciated, security means 409 may be configured to ascertain various types of situations where the security of the keys 410 is potentially compromised and to inform the host 401 of these events.

Figure 7:
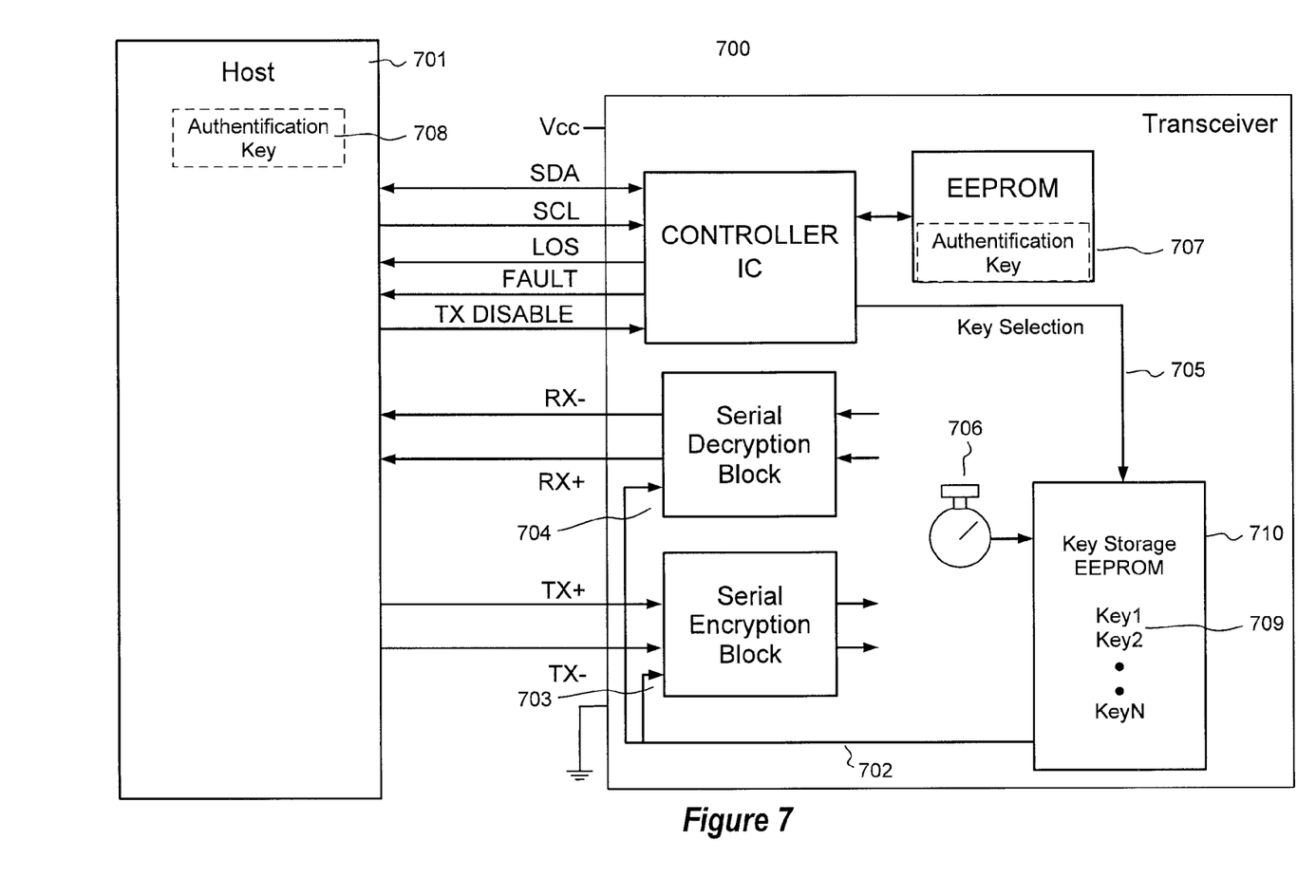
FIG. 7 illustrates a block diagram of an optical transceiver with multiple key storage and selection.

Turning now to FIG. 7, an additional embodiment of an optical transceiver designated at 700 is shown. As shown, the optical transceiver 700 is coupled to a host 701. The optical transceiver 700 includes a serial encryption block 703 and a serial decryption block 704 that correspond to those previously described. In addition, an authentication key 707 may be used in conjunction with an authentication key 708 of the host 701 as previously described.

As further illustrated, the optical transceiver 700 includes a key storage 710 which includes multiple encryption/decryption keys 709. As shown, there may be any number of keys 709 as circumstances warrant. As will be appreciated, the optical transceiver that is paired with optical transceiver 700 should also include the same number of keys 709 in its key storage.

In some embodiments, a counter 706 of some other suitable device may also be included in optical transceiver 700 and in the optical transceiver that is paired with optical transceiver 700. The counter 706 may be used to help the optical transceiver cycle through the various keys 709. For example, every hour or some other desired time period a new key 709 could be provided to the encryption block 703 and the decryption block 704 via connection 702. In some embodiments, the keys may be cycled sequentially from key 1 to key N.

In other embodiments, the control module 711 or the host 701 could specify which key should be chosen at the next time period via connection 705. For instance, the host 701 or control module 711 could specify that the key 67 follow key 37. To ensure that the matching optical transceiver specified a matching key to the one specified by host 701 or control module 711, the order of the key selection could be programmed into host 701 and/or control 711 and their corresponding counterparts in the matching transceiver.

Alternatively, optical transceiver 700 may function as a master to the matching optical transceiver. In such case, either host 701 or control module 711 may specify that it is time to change from one key 709 to another key 709, for example from key 67 to key 37. This information may then be sent to the matching optical transceiver so it may change from key 67 to key 37. In some embodiments, an out-of-band message with the key change information may be sent to the matching optical transceiver.

Accordingly, these embodiments ensure that a particular key 709 is not used for a long period of time, thus helping to ensure that the keys remain secure. As will be appreciated, the longer a particular key is used, the more likely it is that it may be broken by a third party analyzing the encrypted data. As long as optical transceiver 700 and its matching transceiver are properly synchronized so that both know which particular key 709 to use at a particular time, then multiple keys 709 may be used to enhance the security of the keys.

Figure 8:
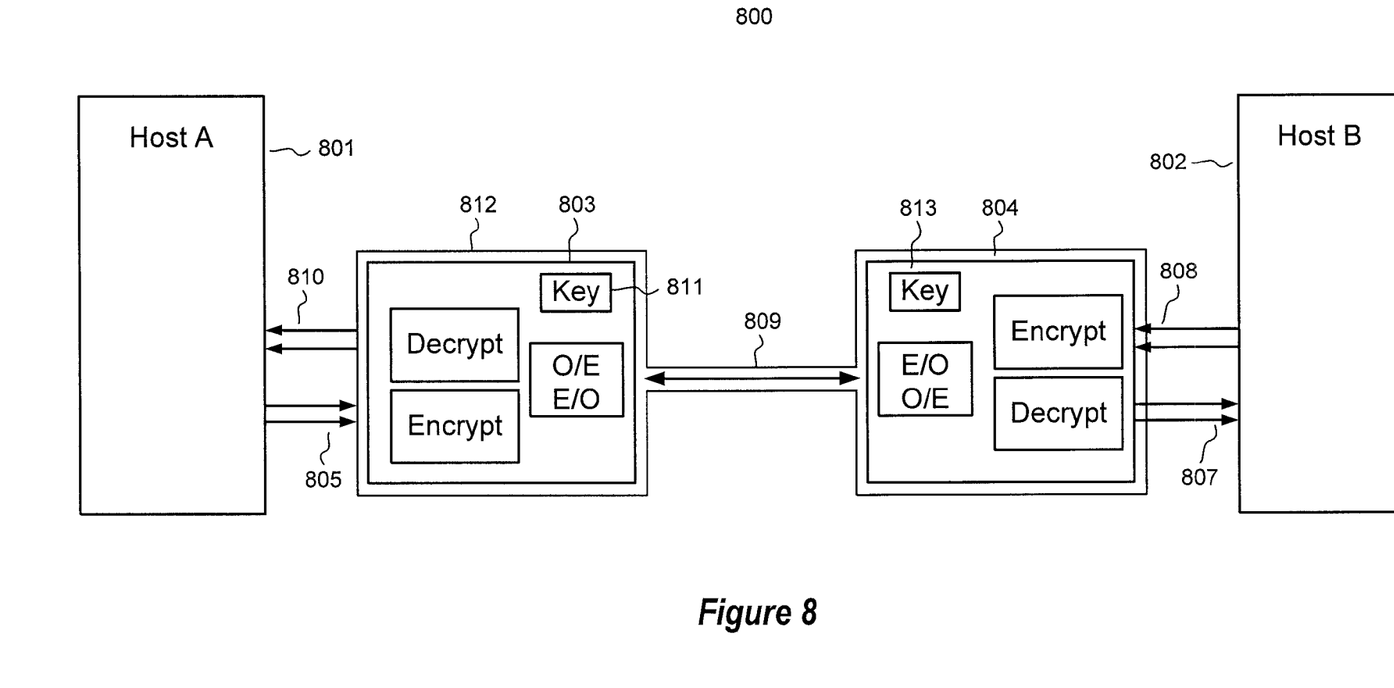
FIG. 8 illustrates a block diagram of an active optical link with encryption and decryption means.

Attention is now made to FIG. 8, which shows an encrypted active optical link 800. The active optical link 800 includes an optical transceiver 803 and an optical transceiver 804 that are connected by an optical cable 809. The optical transceivers 803 and 804 and the cable 809 are integrated as one unit. As shown, the integrated unit includes a protective coating 812 that surrounds the other elements of the active link. Additional detail regarding active optical links is described in commonly owned U.S. Pat. No. 7,499,616, filed Apr. 10, 2006, which is incorporated herein by reference in its entirety.

As shown, the optical transceiver 803 of the active optical link 800 receives transmit optical signals 805 from a host 801. The transmit signals may then be encrypted by an encryption block and a key 811 as previously discussed. A TOSA portion then transmits the encrypted signals over cable 809 to a ROSA portion of transceiver 804. A decryption block and a key 813 which matches key 811 are then used to decrypt the signals as previously described, which may be provided as receive signals 807 to a host 802.

Similarly, the optical transceiver 804 of the active optical link 800 receives transmit optical signals 808 from the host 802. The transmit signals may then be encrypted by an encryption block and the key 813 as previously discussed. A TOSA portion then transmits the encrypted signals over cable 809 to a ROSA portion of transceiver 804. A decryption block and the key 811 which matches key 813 are then used to decrypt the signals as previously described, which may be provided as receive signals 810 to the host 801.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver comprising:
   a transmitter optical subassembly including a fiber receptacle and an optical signal source;
   a receiver optical subassembly including a photodiode and a preamplifier circuit;
   an encryption and decryption key;
   an encryption block operably connected to the transmitter optical subassembly, the encryption block configured to perform an encryption operation on data received from a host device using the encryption and decryption key and to provide the resulting encrypted data to the transmitter optical assembly; and
   a decryption block operably connected to the receiver optical subassembly, decryption block including:
      a demultiplexer configured to receive serial data from the receiver optical subassembly and convert the serial data into parallel data,
      a decryption unit configured to receive the parallel data and perform a decryption operation using the encryption and decryption key,
      a decoder coupled between the demultiplexer and the decryption unit and configured to remove header data or alignment data from the parallel data such that the header data or alignment data is not decrypted, and
      a multiplexer configured to receive the decrypted parallel data and convert the decrypted parallel data into serial data.

2. The transceiver in accordance with claim 1, further comprising a laser driver/post amplifier connected to the transmitter optical subassembly and the receiver optical subassembly, wherein the encryption block or the decryption block are integrated onto the same integrated circuit (IC) as the laser driver/post amplifier.

3. The transceiver in accordance with claim 1, further comprising a control module IC and a memory module having an authentication key stored thereon, wherein the transceiver is configured to authenticate the transceiver by receiving challenge data from a host device and sending response data to the host device using the authentication key.

4. The transceiver in accordance with claim 1, further comprising security means configured to determine if an unauthorized attempt has been made to access the encryption and decryption key.

5. The transceiver in accordance with claim 1, further comprising a memory, wherein the memory includes a key storage unit configured to store a plurality of encryption and decryption keys.

6. The transceiver in accordance with claim 5, wherein the transceiver is configured to rotate through the plurality of encryption and decryption keys such that no particular encryption and decryption key is used for more than a predetermined time interval.

7. The transceiver in accordance with claim 1, wherein the encryption block includes:
   a second demultiplexer configured to receive serial data and convert the serial data into parallel data;
   an encryption unit configured to receive the parallel data and perform an encryption operation using the encryption and decryption key; and
   a multiplexer configured to receive the encrypted parallel data and convert the received encrypted parallel data into serial data.

8. The transceiver in accordance with claim 7, wherein the encryption block further includes:
   a second decoder coupled between the second demultiplexer and the encryption unit and configured to remove header data or alignment data from the parallel data such that the header data or alignment data is not encrypted; and
   a second coder coupled between the encryption unit and the second multiplexer and configured to replace any header data or alignment data that was removed by the second decoder to the parallel data.

9. The transceiver in accordance with claim 1, wherein the decryption block further comprises:
   a coder coupled between the decryption unit and the multiplexer and configured to replace any header data or alignment data that was removed by the decoder to the parallel data.

10. In a local optical transceiver that includes an encryption block and a decryption block, a method for encrypting and/or decrypting data at the local optical transceiver, the method comprising:
- writing an encryption and decryption key to an encryption and decryption key storage unit in memory of the local transceiver using a write-only interface;
- receiving unencrypted serial data at the encryption block from a host device that is coupled to the local optical transceiver;
- demultiplexing the unencrypted serial data into unencrypted parallel data;
- removing header data from the unencrypted parallel data;
- at the encryption block, performing an encryption operation on the unencrypted parallel data using the encryption and decryption key to encrypt the unencrypted parallel data;
- multiplexing the encrypted parallel data into encrypted serial data; and
- transmitting the encrypted serial data to a remote optical transceiver.

11. The method in accordance with claim 10, further comprising:
- at the decryption block, receiving encrypted data from the remote optical transceiver;
- at the decryption block, performing a decryption operation on the received encrypted data using the encryption and decryption key to decrypt the encrypted data; and
- providing the unencrypted data to the host device.

12. The method in accordance with claim 10, wherein the remote optical transceiver is a matching optical transceiver that is substantially identical to the local optical transceiver.

13. The method in accordance with claim 12, wherein the remote optical transceiver includes a second encryption and decryption key that matches the encryption and decryption key.

14. The method in accordance with claim 10, the method further comprising:
- writing to the encryption and decryption key storage unit a plurality of encryption and decryption keys using the write-only interface; and
- at the encryption block, cycling through the plurality of encryption and decryption keys when performing the encryption operation such that no present encryption and decryption key of the plurality of encryption and decryption keys is used for more than a predetermined time interval.

15. The method in accordance with claim 14, wherein cycling through the plurality of encryption and decryption keys comprises one of:
- cycling through the plurality of encryption and decryption keys in response to a counter reaching the predetermined time interval; or
- receiving a command from a control module or a host device indicating that the present encryption and decryption key should be changed to another of the plurality of encryption and decryption keys.

16. The method in accordance with claim 11, the method further comprising:
- writing to the encryption and decryption key storage unit a plurality of encryption and decryption keys using the write-only interface; and
- at the decryption block, cycling through the plurality of encryption and decryption keys when performing the decryption operation such that no present encryption and decryption key of the plurality of encryption and decryption keys is used for more than a predetermined time interval.

17. The method in accordance with claim 10, the method further comprising:
- determining if an attempt has been made to access the encryption and decryption key by sensing whether a cover of the local transceiver has been removed.

* * * * *